March 25, 1952
D. E. FRITZ
2,590,169
TORSIONAL DRIVE SHAFT
Filed Jan. 31, 1951
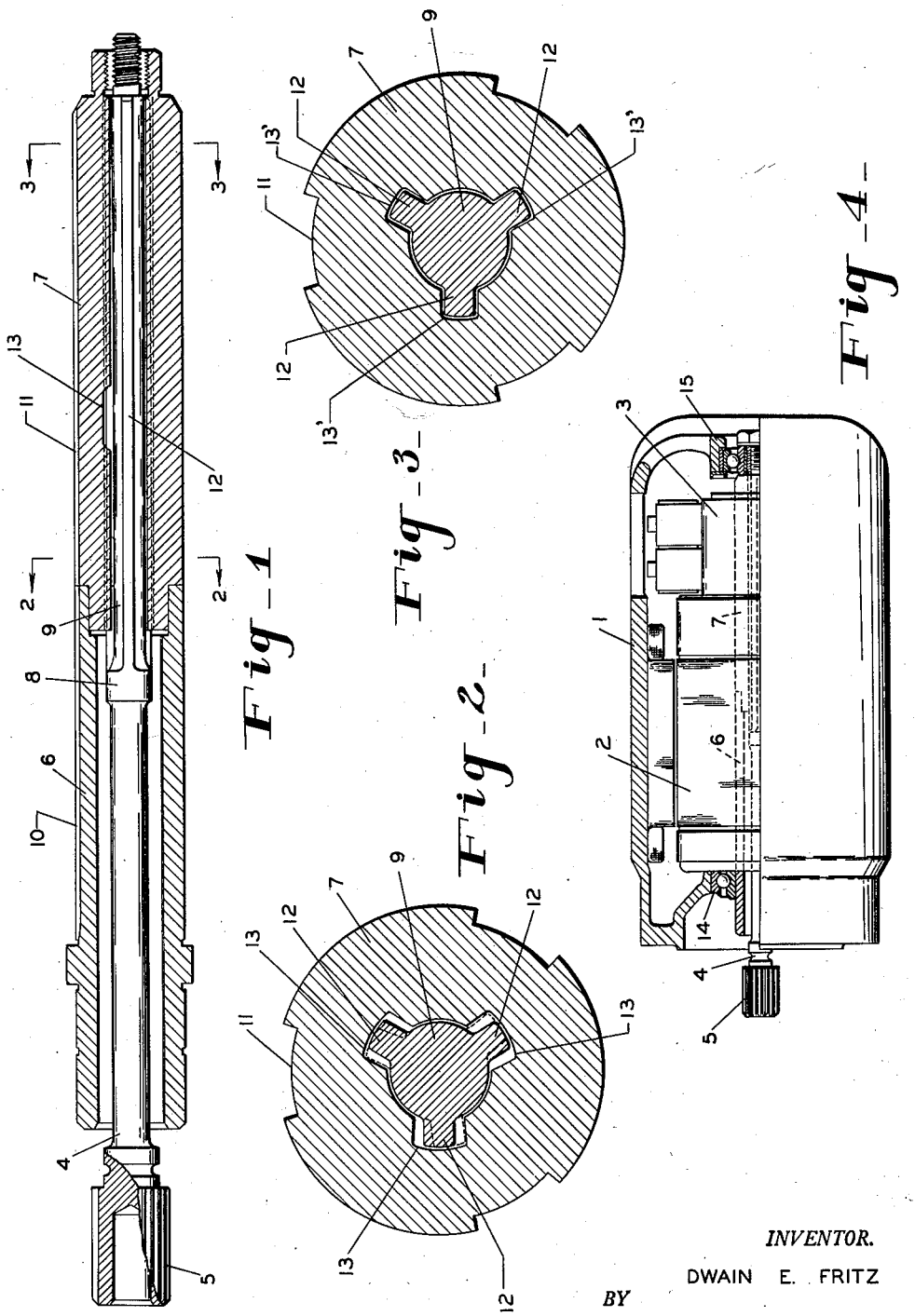
INVENTOR.
DWAIN E. FRITZ
BY
*Frank H. Harmon*
ATTORNEY Patented Mar. 25, 1952

2,590,169

UNITED STATES PATENT OFFICE 2,590,169

TORSIONAL DRIVE SHAFT

Dwain E. Fritz, Cleveland, Ohio, assignor to Jack & Heintz Precision Industries, Inc., Cleveland, Ohio, a corporation of Delaware Application January 31, 1951, Serial No. 208,815

5 Claims. (Cl. 64—1)

This invention relates in general to drive shafts and more particularly to improvements in such engine driven electrical devices as generators.

Accessories, such as generators and the like, that are driven from a pulsating source, such as an engine, are subjected to torsional stresses and vibrations, far in excess of the calculated load stress, arising from the delivery of useful power.

The conventional approach to the solution of this problem has been the provision of added complicated counterweights, centrifugal clutches and the like, in order to prevent the transmission of vibratory torsional stresses, or in other words, as an added accessory, a torsional vibration damper for the generator shaft. Such conventional constructions involve the use of a hollow tube, inside of which is disposed a generator drive shaft that carry such torsional vibration damping accessories.

One of the primary objects of my invention is to provide an improved shaft and tube construction wherein, without the necessity of the usual added accessories, the shaft and tube are inherently adapted to efficiently absorb and dampen all of the engine applied pulsating vibrations.

Another object is to provide such an inherent torsional vibration damper construction that involves the use of an inherently flexible drive shaft splined with progressively varying clearance in co-mating splines of the hollow tube carrying the generator armature and commutator, so as to render the shaft a variable spring drive shaft to damp out torsional vibration.

A further object is to dispose this progressively tightening varying splined connection, approximately midway of the drive shaft toward the output end thereof, for more accurately absorbing and damping of the torsional vibrations and setting up such a progressive damping system of infinite varying degree, that at no time, and under no conditions of operation, can there ever be set up a vibratory frequency.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in longitudinal section taken through the generator hollow tube that carries the armature and commutator, showing the generator shaft in side elevation;

Figure 2 is a view in section taken along line 2—2 of Figure 1;

Figure 3 is a view in section taken along line 3—3 of Figure 1; and

Figure 4 is a view in side elevation of the generator, partly broken away to show the armature commutator, hollow tube and drive shaft.

Referring more particularly to the drawings, in Figure 4 there is shown generally the outline of a generator casing 1 with its usual armature 2, commutator 3, generator shaft 4 and splined driving end 5 for suitable driving connection to an engine.

The usual hollow stiff tube that is either splined to, or splined to a sleeve carried by, the armature and commutator is shown as comprising two longitudinally coextensive parts 6 and 7, of differing cross section, characteristics, the two being rotative with the armature and commutator.

Substantially one half of the length of the combined tube, which half is designated at 6, is hollow and cylindrical, and adequately spaced therein is the input half 4 of the round generator drive shaft portion that is integral with spline 5 driven by the engine. The round portion of the shaft 4 terminates at the enlarged collar 8, to the right of which, as viewed in Figure 1, the general cylindrical outside diameter of the generator shaft 4 is reduced, as shown more clearly in Figures 2 and 3 at 9. Keys 10 illustrate a key connection for section 6 to the armature and key slots 11 illustrate a key connection to the armature and commutator. The quill, or flexible right hand section of the generator shaft 9, is provided with three equidistantly circumferentially spaced radially extending splines 12.

It is to be understood that the drive of the generator armature and commutator is from the engine through the drive shafts 4 and 9. Now instead of the inclusion of complicated added accessories, such as centrifugal governor type friction clutch devices for absorbing torsional vibrations, due to pulsating power inputs by the engine, I propose to more efficiently accomplish this objective by a new and novel combined and cooperating inherent quill and tube construction.

This I propose to accomplish by providing at the section 2—2 of Figure 1, as shown in Figure 2, three radially extending slots 13 radiating outwardly from a central aperture in tube 7 whose central aperture is considerably less in cross sectional dimensions than that of tube 6.

The complete generator shaft is of torsionally flexible metal, such as steel. Figure 2 shows, as a section close to the right of collar 8, the shaft splines 12 to be loosely engaged in slots 13 with space on each side of the splines 12. The splines 12 may be uniform toward the right, as viewed in Figure 1, but the radial slots, 13, are gradually and progressively narrowed until they mate with no clearance with splines 12, as shown at 13' in Figure 3. Bearing 14 supports tube 6 and bearing 15 supports tube 7.

Thus, it will be seen that I have provided a simple, compact and efficient means for damping torsional vibrations in the drive shaft. The torsionally flexible shaft and its splines that engage those of the tube permit longitudinal twisting of the shaft to dampen the torsional vibrations set up in the shaft by the pulsating input power drive of the engine. Moreover, the arrangement of the output half of the length of the generator shaft with progressively lessening clearance, from a maximum looseness circumferentially, between the splines of the shaft and tube, provides an inherently variable spring drive that varies in an infinite number of degrees throughout the length of the shaft. This insures absorption of torsional and lateral vibrations and compensates for misalignment of rotor bearings and driving connections. While I have shown splines 12 to be uniform and slots 13 to progressively vary in size throughout their lengths, I could make the slots 13 uniform and progressively vary the widths of the splines 12. While I have shown my torsional vibration damping drive shaft as a generator drive shaft, it is to be understood that it may be employed to drive other mechanisms. Moreover, while I have shown the spline 5 as the input end of the shaft, it is to be understood that my invention embraces the use of it as the output end of the shaft.

I claim:

1. In a machine adapted to be driven by a pulsating power source, a hollow tube and a rotor mounted thereon, a torsionally resilient drive shaft mounted in said tube to be driven by said power source, said shaft having a set of radially outwardly extending longitudinal splines for engaging a set of radially inwardly extending longitudinal splines on said tube to constitute a driving connection between said shaft and said tube, at least one of said sets of splines being formed to progressively vary in width toward one end of said shaft so as to mate with progressively decreasing clearance with said other set of splines toward that end of said shaft to provide an inherently infinitely variable torsional spring shaft drive to absorb the vibrations set up by said pulsating power source.

2. In a machine adapted to be driven by a pulsating power source, a hollow tube and a rotor mounted thereon, a torsionally resilient drive shaft mounted in said tube to be driven by said power source, a portion of said shaft having a set of radially outwardly extending longitudinal splines for engaging a set of radially inwardly extending longitudinal splines on said tube to constitute a driving connection between said shaft and said tube, at least one of said sets of splines being formed to progressively vary in width toward the output end of said shaft so as to mate with progressively decreasing clearance with said other set of splines toward the output end of said shaft to provide an inherently infinitely variable torsional spring shaft drive to absorb the vibrations set up by said pulsating power source.

3. In a machine adapted to be driven by a pulsating power source, a hollow tube and a rotor mounted thereon, end bearings for said tube, a torsionally resilient drive shaft in said tube to be driven by said power source, said shaft having radially outwardly extending splines for engaging inner radial slots in said tube to constitute a driving connection between said shaft and said tube, said splines being uniform in circumferential width throughout their lengths and said slots progressively varying in circumferential width to become narrower toward one end of said shaft so that said splines mate with progressively decreasing clearance with said slots toward that end of said shaft to provide an inherently infinitely variable torsional spring shaft drive to absorb the vibrations set up by said pulsating power source.

4. In a machine adapted to be driven by a pulsating power source, a hollow tube and a rotor mounted thereon, end bearings for said tube, a torsionally resilient drive shaft in said tube to be driven by said power source, said shaft having radially outwardly extending splines for engaging inner radial slots in said tube to constitute a driving connection between said shaft and said tube, said splines being uniform in circumferential width throughout their lengths and said slots progressively varying in circumferential width to become narrower at the output end of said shaft so that said splines mate with progressively decreasing clearance with said slots toward the output end of said shaft to provide an inherently infinitely variable torsional spring shaft drive to absorb the vibrations set up by said pulsating power source.

5. In a machine adapted to be driven by a pulsating power source, a hollow tube and a rotor mounted thereon, end bearings for said tube, a torsionally resilient drive shaft in said tube to be driven by said power source, the input portion of said shaft adjacent the driving connection between said shaft and said power source, being free of connection to said tube, a substantial length of the output portion of said shaft having radially outwardly extending splines for engaging inner radial slots in said tube to constitute a driving connection between said shaft and said tube, said splines being uniform in circumferential width throughout their lengths and said slots progressively varying in circumferential width to become narrower toward the output end of said shaft so that said splines mate with progressively decreasing clearance with said slots toward that end of said shaft to provide an inherently infinitely variable torsional spring shaft drive to absorb the vibrations set up by said pulsating power source.

DWAIN E. FRITZ.

REFERENCES CITED

The following references are of record in the file of this patent:

UNITED STATES PATENTS

| Number | Name | Date |
|---|---|---|
| 2,346,432 | Heintz | Apr. 11, 1944 |